United States Patent
Nayar (10) Patent No.: US 10,205,418 B2
(45) Date of Patent: Feb. 12, 2019

(54) ATTACHMENT SYSTEM AND NUT FOR SOLAR PANEL RACKING SYSTEM

(71) Applicant: Polar Racking Inc., Toronto (CA)

(72) Inventor: Manish Nayar, Windsor (CA)

(73) Assignee: Polar Racking Inc., Toronto (CA)

( * ) Notice: Subject to any disclaimer, the term of this patent is extended or adjusted under 35 U.S.C. 154(b) by 0 days.

(21) Appl. No.: 14/884,499

(22) Filed: Oct. 15, 2015

(65) Prior Publication Data

US 2016/0111995 A1 Apr. 21, 2016

Related U.S. Application Data

(60) Provisional application No. 62/065,188, filed on Oct. 17, 2014.

(51) Int. Cl.
*H02S 20/20* (2014.01)
*H02S 20/23* (2014.01)
*F24J 2/52* (2006.01)
*F24J 2/46* (2006.01)

(52) U.S. Cl.
CPC ............. *H02S 20/23* (2014.12); *F24J 2/5205* (2013.01); *F24J 2/5247* (2013.01); *F24J 2/5258* (2013.01); *F24J 2002/4665* (2013.01); *F24J 2002/4667* (2013.01); *F24J 2002/5288* (2013.01); *Y02B 10/12* (2013.01); *Y02E 10/47* (2013.01)

(58) Field of Classification Search
CPC ........ H02S 20/23; F24J 2/5205; F24J 2/5258; F24J 2/5247; F24J 2002/5288; F24J 2002/4665; F24J 2002/4667
See application file for complete search history.

(56) References Cited

U.S. PATENT DOCUMENTS

| | | | | | |
|---|---|---|---|---|---|
| 741,747 | A | * | 10/1903 | Walz | F16B 39/10 411/139 |
| 2,676,680 | A | * | 4/1954 | Kindorf | E04B 9/183 238/342 |
| 4,073,113 | A | * | 2/1978 | Oudot | E04B 1/24 403/189 |
| 4,830,531 | A | * | 5/1989 | Condit | F16B 37/045 403/348 |
| 4,957,402 | A | * | 9/1990 | Klein | F16B 37/045 411/166 |
| 5,352,078 | A | * | 10/1994 | Nasu | F16B 2/065 248/228.3 |
| 5,779,412 | A | * | 7/1998 | Nagai | E04B 2/766 411/104 |

(Continued)

*Primary Examiner* — Stanton L Krycinski
(74) *Attorney, Agent, or Firm* — Kolisch Hartwell, P.C.

(57) ABSTRACT

An attachment system for a solar panel racking system is provided. The attachment system comprises a rail, a nut and a fastener. The rail includes a receiver to releasably receive the nut. The receiver has an arcuate channel and a retainer. The nut has an arcuate portion sized and dimensioned to be receivable within the arcuate channel, and a flange for releasable engagement with the retainer. Upon receipt of the arcuate portion within the arcuate channel, the flange releasably engages the retainer to releasably engage the nut within the receiver. The fastener secures the nut within the receiver and thereby secures the rail to the structure. The arcuate channel assists in the releasable engagement between the nut and the rail by assisting in cooperatively orienting and positioning the nut to guide the nut into the receiver.

18 Claims, 11 Drawing Sheets

(56) References Cited

U.S. PATENT DOCUMENTS

| | | | | |
|---|---|---|---|---|
| 5,797,573 A * | 8/1998 | Nasu | B25B 5/08 | 248/228.2 |
| 5,875,600 A * | 3/1999 | Redman | E06B 3/9642 | 403/230 |
| 6,086,300 A * | 7/2000 | Frohlich | F16B 37/045 | 411/107 |
| 6,672,018 B2 | 1/2004 | Shingleton | F24J 2/5205 | 126/621 |
| 6,827,531 B2 * | 12/2004 | Womack | B61D 45/001 | 410/104 |
| 7,260,918 B2 * | 8/2007 | Liebendorfer | F24J 2/5205 | 136/244 |
| 7,338,245 B2 * | 3/2008 | Ladouceur | F16B 27/00 | 29/432.1 |
| 7,386,922 B1 * | 6/2008 | Taylor | E04D 13/10 | 24/525 |
| 7,434,364 B2 * | 10/2008 | MacDermott | E04B 2/745 | 52/127.11 |
| 7,634,875 B2 * | 12/2009 | Genschorek | F24J 2/045 | 403/331 |
| 8,128,044 B2 * | 3/2012 | Liebendorfer | F24J 2/5205 | 136/244 |
| 8,250,829 B2 * | 8/2012 | McPheeters | E04D 13/1476 | 136/244 |
| 8,407,895 B2 * | 4/2013 | Hartelius | F24J 2/5232 | 248/309.1 |
| 8,595,997 B2 * | 12/2013 | Wu | F24J 2/5205 | 136/244 |
| 8,640,401 B2 * | 2/2014 | Hong | F24J 2/5205 | 248/230.2 |
| 8,925,263 B2 * | 1/2015 | Haddock | F24J 2/5254 | 136/251 |
| 9,051,950 B2 * | 6/2015 | Jaffari | F16B 2/065 | |
| 9,097,443 B2 * | 8/2015 | Liu | F24J 2/5258 | |
| 9,115,741 B2 * | 8/2015 | Oetlinger | B31B 3/00 | |
| 9,154,074 B2 * | 10/2015 | West | F24J 2/5211 | |
| 9,506,600 B1 * | 11/2016 | Li | H02S 20/00 | |
| 9,577,571 B2 * | 2/2017 | Atia | H02S 20/23 | |
| 2003/0101662 A1 * | 6/2003 | Ullman | E04D 13/12 | 52/27 |
| 2003/0177706 A1 * | 9/2003 | Ullman | E04D 13/12 | 52/3 |
| 2003/0198530 A1 * | 10/2003 | Hoffmann | F16B 37/045 | 411/84 |
| 2003/0206785 A1 * | 11/2003 | Hoffmann | F16B 37/045 | 411/84 |
| 2004/0163338 A1 * | 8/2004 | Liebendorfer | F24J 2/5207 | 52/173.1 |
| 2006/0156651 A1 * | 7/2006 | Genschorek | F24J 2/045 | 52/200 |
| 2011/0126881 A1 * | 6/2011 | Hong | F24J 2/5205 | 136/244 |
| 2011/0174947 A1 * | 7/2011 | Wu | F24J 2/5205 | 248/226.11 |
| 2013/0320175 A1 * | 12/2013 | Kemple | F16B 7/0493 | 248/316.1 |
| 2014/0041202 A1 * | 2/2014 | Schnitzer | F24J 2/5249 | 29/525.01 |

* cited by examiner

ATTACHMENT SYSTEM AND NUT FOR SOLAR PANEL RACKING SYSTEM

CROSS-REFERENCE TO RELATED APPLICATION

This application claims priority to and the benefit of U.S. Provisional Patent Application No. 62/065,188 entitled "Attachment System and Nut for Solar Panel Racking System", filed on Oct. 17, 2014, the entire disclosure of which is hereby incorporated herein by reference.

FIELD

The present disclosure relates to an attachment system for solar panel racking systems, and a nut therefor.

BACKGROUND OF THE INVENTION

Solar panels are typically mounted over surfaces, such as residential or commercial building rooftops, using solar panel racking systems. The racking systems commonly include a series of longitudinal rails, that span the length of a rooftop, and a series of lateral rails disposed perpendicular to the longitudinal rails. The longitudinal rails are fastened or attached to the roof using a series of roof clamps or clips. Typically, each lateral rail is shaped and dimensioned to define a channel for receiving an edge of a solar panel, and is releasably attached to a plurality of longitudinal rails such that the solar panels are securely held on the roof and set-off a fixed distance from the roof material. In some instances, the various rails may be designed to hold the panels at an inclined angle.

SUMMARY

There is provided an attachment system for a solar panel racking system, the solar panel racking system including a structure, the attachment system includes a rail, a nut, and a fastener, the rail including a receiver to releasably receive the nut, the receiver having an arcuate channel and a retainer, the nut having an arcuate portion sized and dimensioned to be receivable within the arcuate channel, and having a flange for releasable engagement with the retainer, wherein upon the arcuate portion being received within the arcuate channel, the flange releasably engages the retainer to releasably engage the nut within the receiver, the arcuate channel assisting in the releasable engagement between the nut and the rail by assisting in cooperatively orienting and positioning the nut to guide the nut into the receiver, the fastener securing the nut within the receiver and thereby securing the rail to the structure.

There is also provided an attachment system for a solar panel racking system, the solar panel racking system including a structure, the attachment system includes a rail, a nut, and a fastener, the rail including an arcuate channel and a retainer, the nut having an arcuate portion and a flange, wherein upon the arcuate portion being received within the arcuate channel, the flange releasably engages the retainer to releasably engage the nut to the rail, the fastener securing the nut to the rail and thereby securing the rail to the structure.

There is further provided a nut for use in securing a rail to a structure, the rail including a receiver to releasably receive the nut, the receiver having an arcuate channel and a retainer, the nut involving an arcuate portion sized and dimensioned to be receivable within the arcuate channel, and a flange for releasable engagement with the retainer, wherein upon receipt of the arcuate portion within the arcuate channel, the flange releasably engages the retainer to releasably engage the nut within the receiver.

Further aspects of the invention will become apparent from the following description taken together with the accompanying drawings.

BRIEF DESCRIPTION OF THE DRAWINGS

For a better understanding of the present disclosure, and to show more clearly how it may be carried into effect, reference will now be made, by way of example, to the accompanying drawings which show exemplary embodiments of the present disclosure in which.

DETAILED DESCRIPTION

The present invention may be embodied in a number of different forms. The specification and drawings that follow describe and disclose some of the specific forms of the invention.

Figure 1:
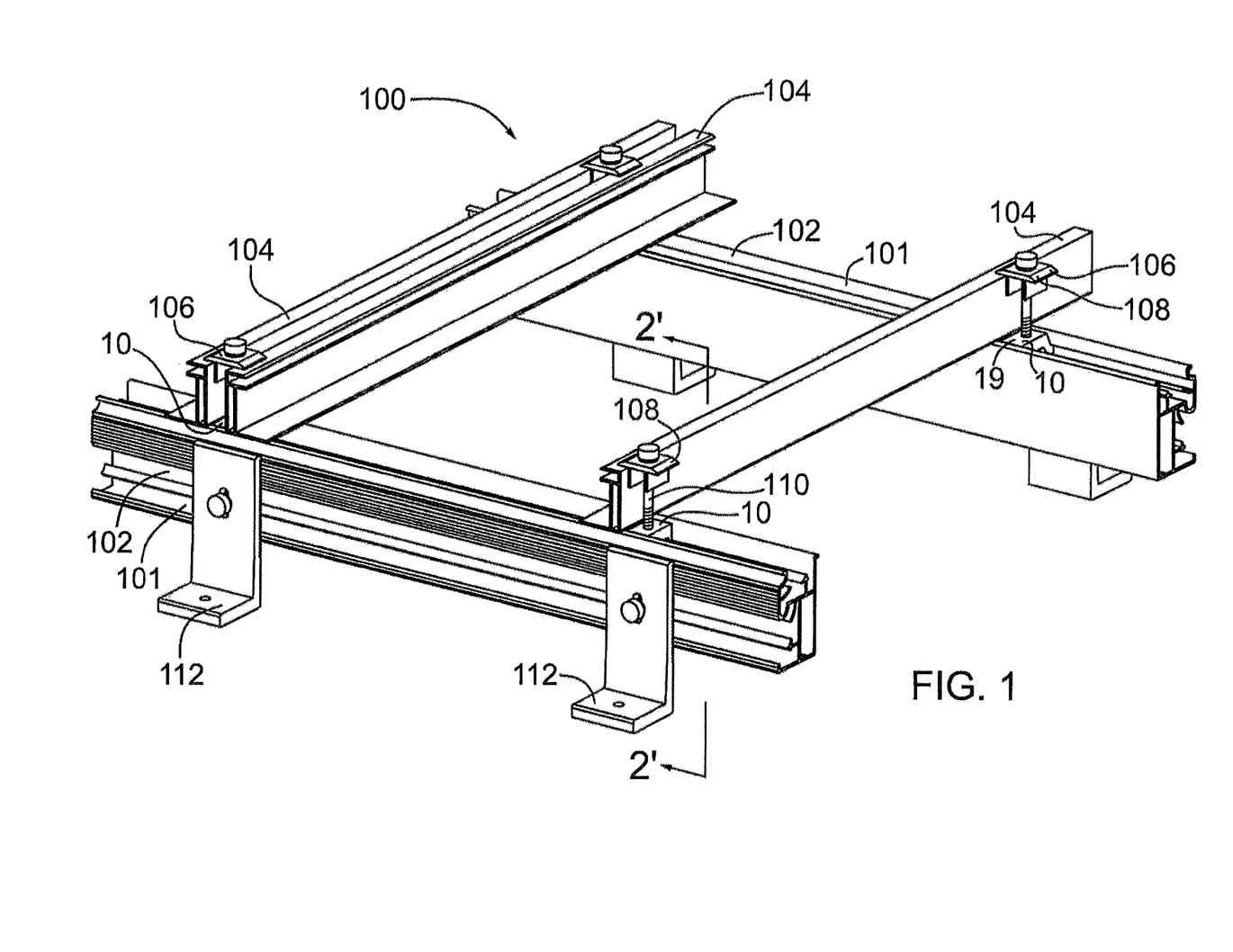
FIG. 1 is an upper perspective view of a solar panel racking system with an attachment system constructed in accordance with an embodiment of the present disclosure.

Referring to FIGS. 1 through 13, an attachment system for a solar panel racking system is noted generally by reference numeral 2. As shown in FIG. 1, a typical solar panel racking system 100 includes a series of longitudinal rails 102 and a series of lateral rails 104 disposed generally perpendicularly to the longitudinal rails. Each lateral rail 104 is releasably secured to one or more longitudinal rails 102 by one or more clamps 106. The longitudinal rails are secured to a surface over which the solar panels are to be mounted (within the lateral rails) by mounting brackets 112. The mounting brackets are typically bolted, screwed or otherwise fastened to the surface.

Figure 3:
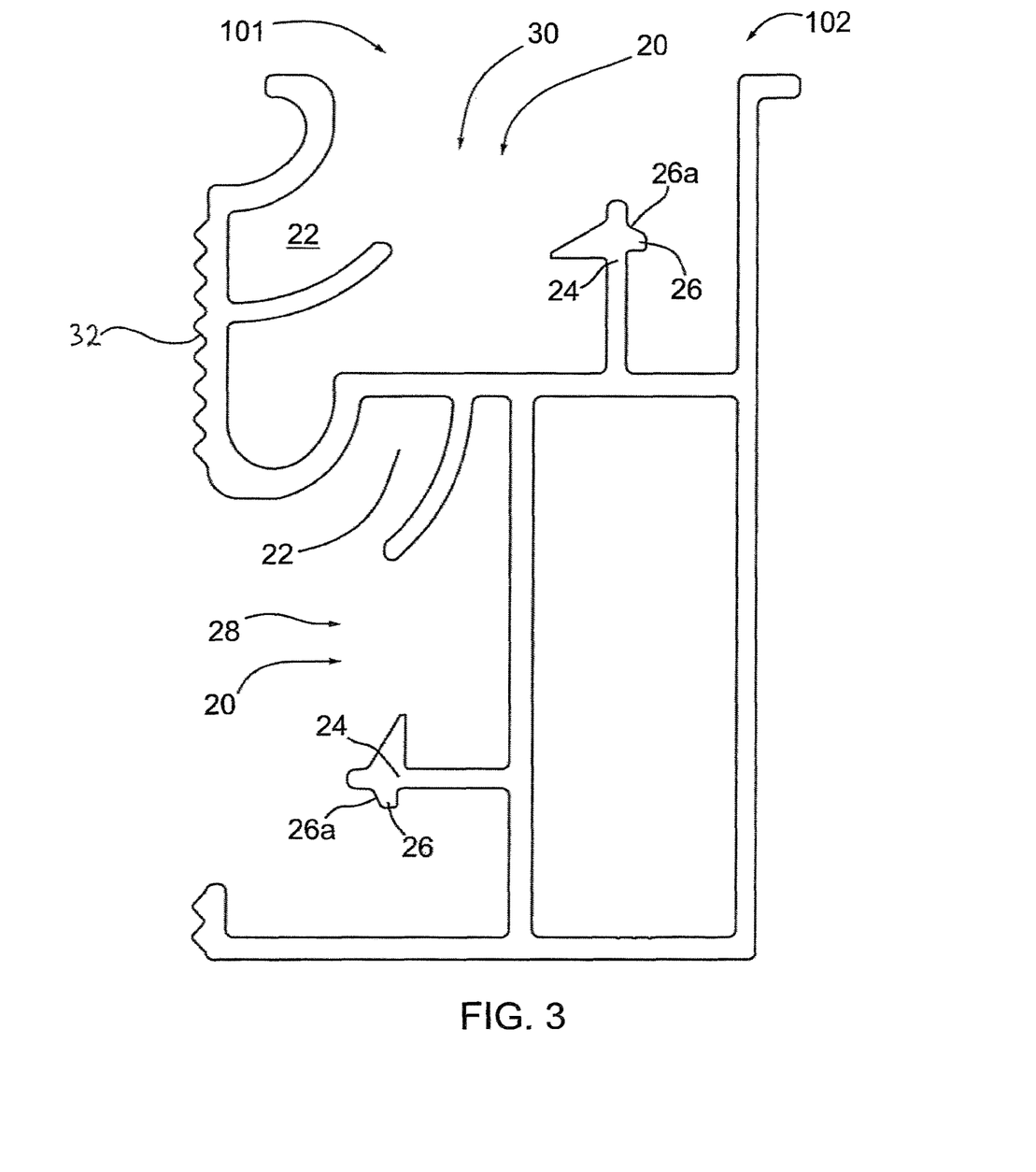
FIG. 3 is a side view of a longitudinal rail of the attachment system of FIG. 1.

Attachment system 2 includes rail 101 and nut 10. In the figures, rail 101 of the attachment system is shown as longitudinal rail 102. However, it will be appreciated that in other applications, rail 101 may represent an alternate rail or component of the racking system. As shown in FIG. 3, rail 101/102 includes one or more receivers 20, each being accessible by nut 10. A receiver 20 of each rail 101/102 includes an arcuate channel 22 and a retainer 24.

Figure 4:
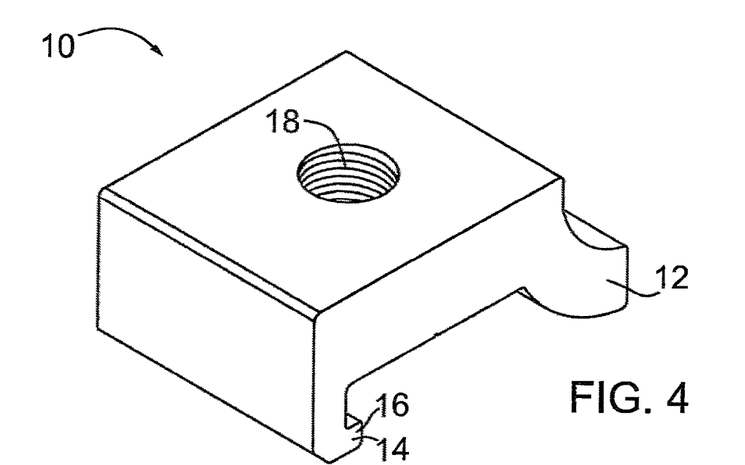
FIG. 4 is an upper perspective view of a nut of the attachment system of FIG. 1.
Figure 5:
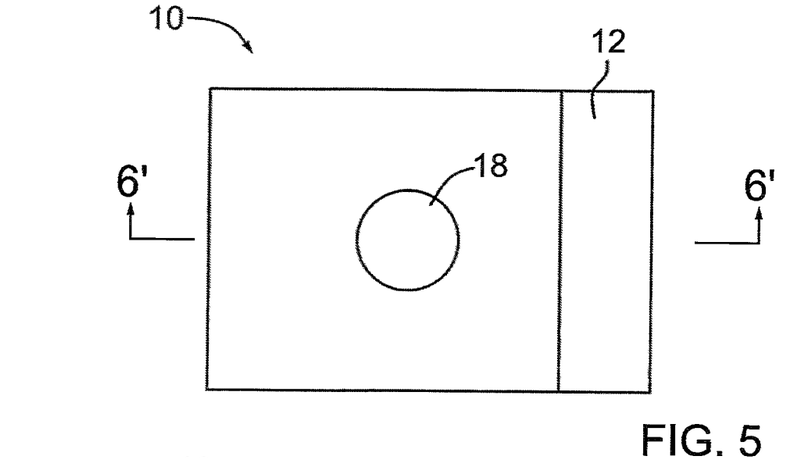
FIG. 5 is a top view of the nut of FIG. 4.
Figure 6:
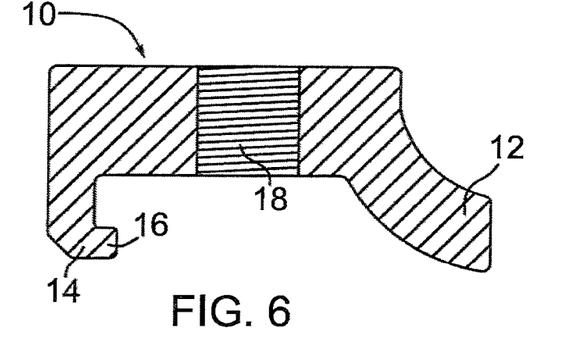
FIG. 6 is sectional view of the nut of FIG. 4 taken along the line 6'-6'.
Figure 7:
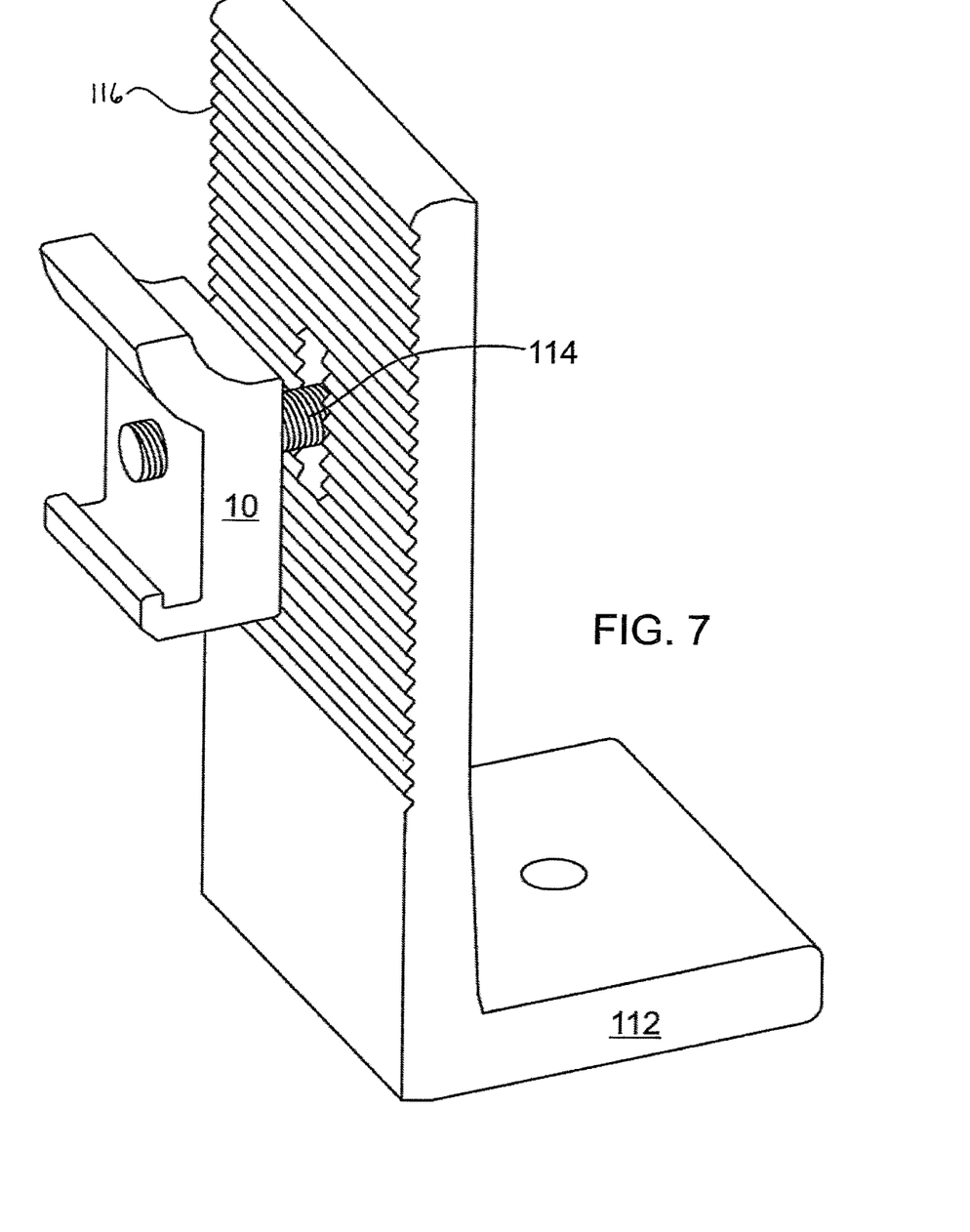
FIG. 7 is a perspective view of the nut of FIG. 4 and a mounting bracket.
Figure 8:
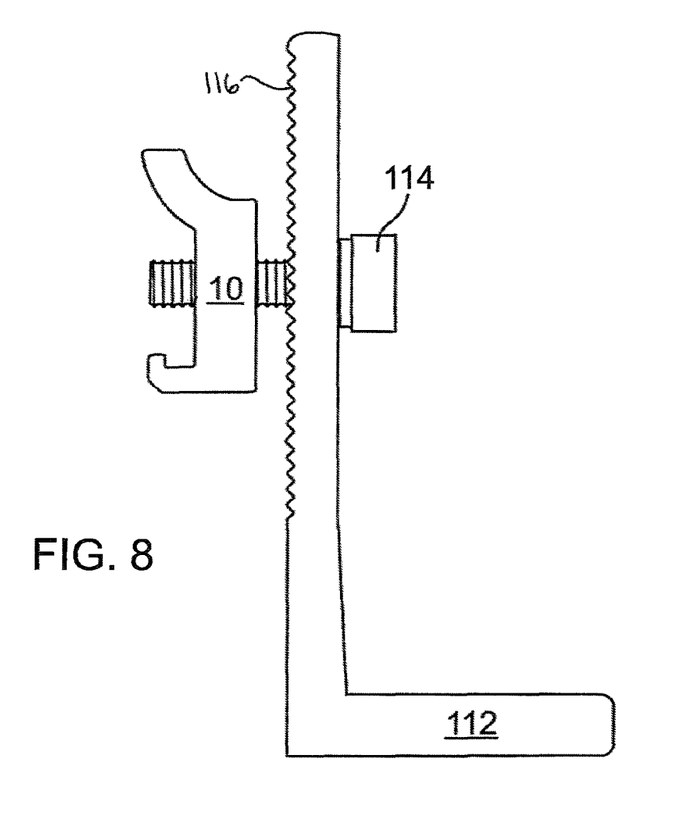
FIG. 8 is a side view of the nut and mounting bracket of FIG. 7.
Figure 9:
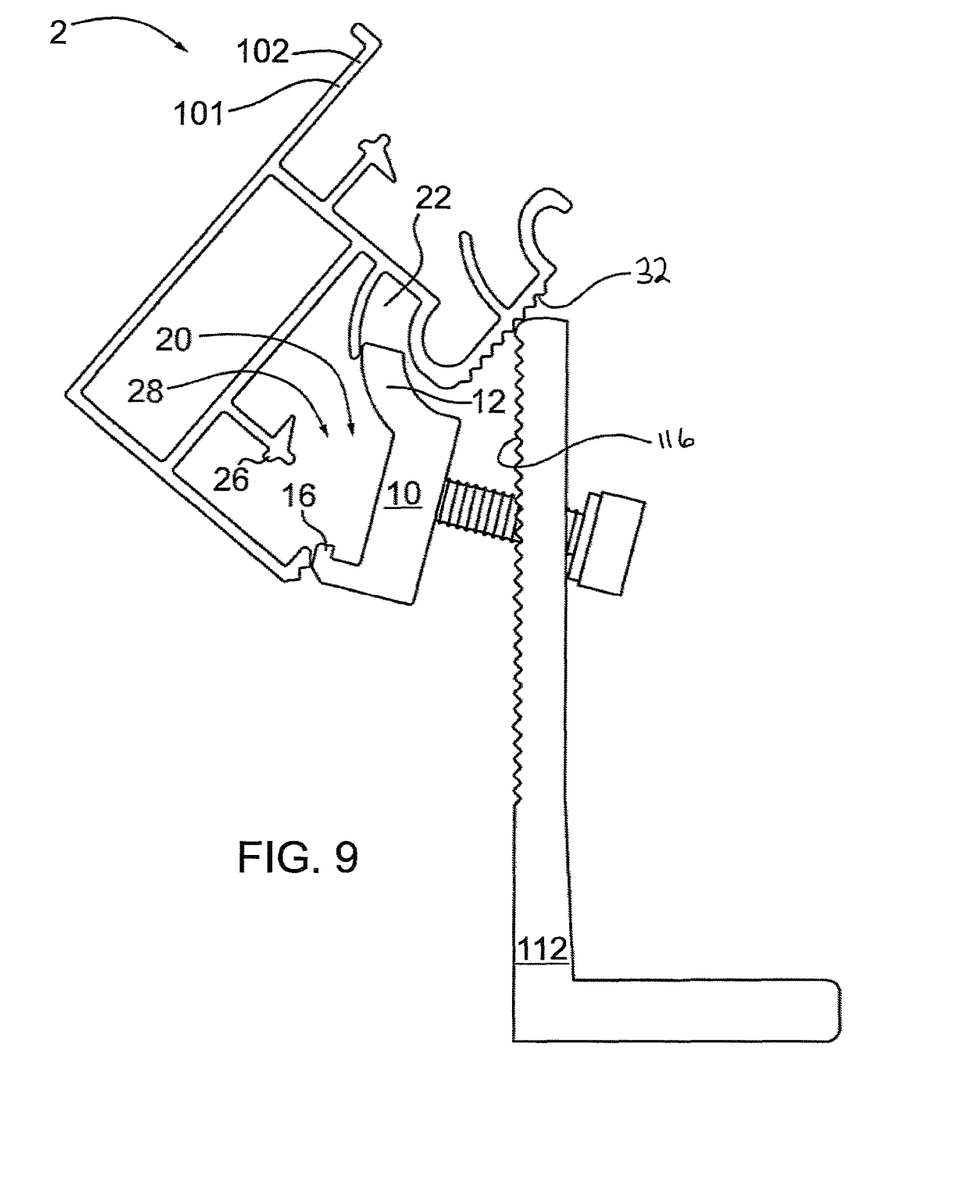
FIG. 9 is a side sectional view of the longitudinal rail as shown in FIG. 2 wherein the nut is in the process of being received within the receiver of the rail.

Referring to FIGS. 4 through 6, each nut 10 has an arcuate portion 12, a flange 14, and a bore 18 for receiving a bolt, fastener or fastening means therethrough. The bore may be threaded for cooperative receipt of a threaded bolt, such as bolts 110, 114. Flange 14 is capable of releasable engagement with the retainer 24 of rail 101/102, typically releasable by hand and without the use of tools. Further, arcuate portion 12 is sized and dimensioned to be receivable within the arcuate channel of rail 101/102. As the arcuate portion of the nut is received within arcuate channel 22, flange 14 releasably engages retainer 24 to releasably engage nut 10 with the receiver of rail 101/102, as shown in FIGS. 9 to 12, again, the nut 10 may be releasably engaged by hand. The arcuate channel assists in the releasable engagement between the nut and the rail by assisting in cooperatively orienting and positioning the nut and helping to guide it into receiver 20.

Figure 2:
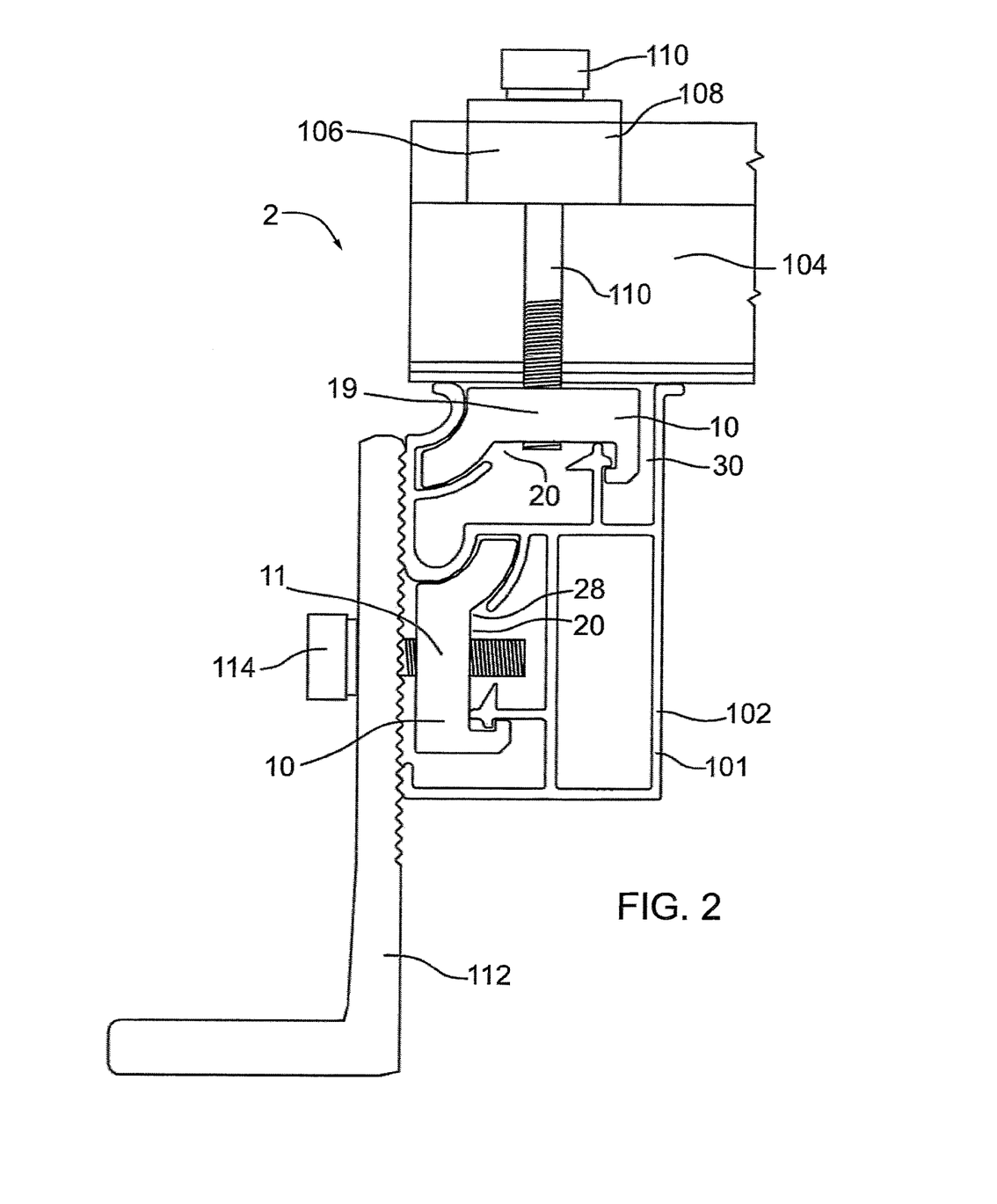
FIG. 2 is a side view of a section of the attachment system of FIG. 1 taken along the line 2'-2'.

In the embodiment shown in the figures, rail 101/102 has two receivers (first receiver 28 and second receiver 30). Each of the first and second receivers has an arcuate channel and a retainer for releasably receiving therein respective first and second nuts 11, 19. Referring to FIG. 2, the first receiver 28 is arranged for releasable attachment of rail 101/102 to mounting bracket 112 via first nut 11, in order to secure the rail to a surface. Second receiver 30 is arranged for releasable attachment of rail 101/102 to lateral rail 104 via second nut 19, in order to secure the longitudinal rail to a lateral rail. In the embodiment shown, the second receiver is arranged perpendicularly to and above the first receiver. Other arrangements of receivers are also possible, depending on the configuration of the rails and/or mounting brackets.

The figures attached depict embodiments wherein second nut 19 forms part of clamp 106 (comprised of head portion 108 coupled to second nut 19 by bolt 110) in order to releasably secure lateral rail 104 to longitudinal rail 102, and further depict first nut 11 releasably securing rail 101/102 to a surface via mounting bracket 112. It will be understood that other configurations for releasable attachment between the rails, or between rail 101/102 and the surface, using first and second nuts 11, 19 and first and second receivers 28, 30, respectively, are within the scope of the present disclosure.

Figure 10:
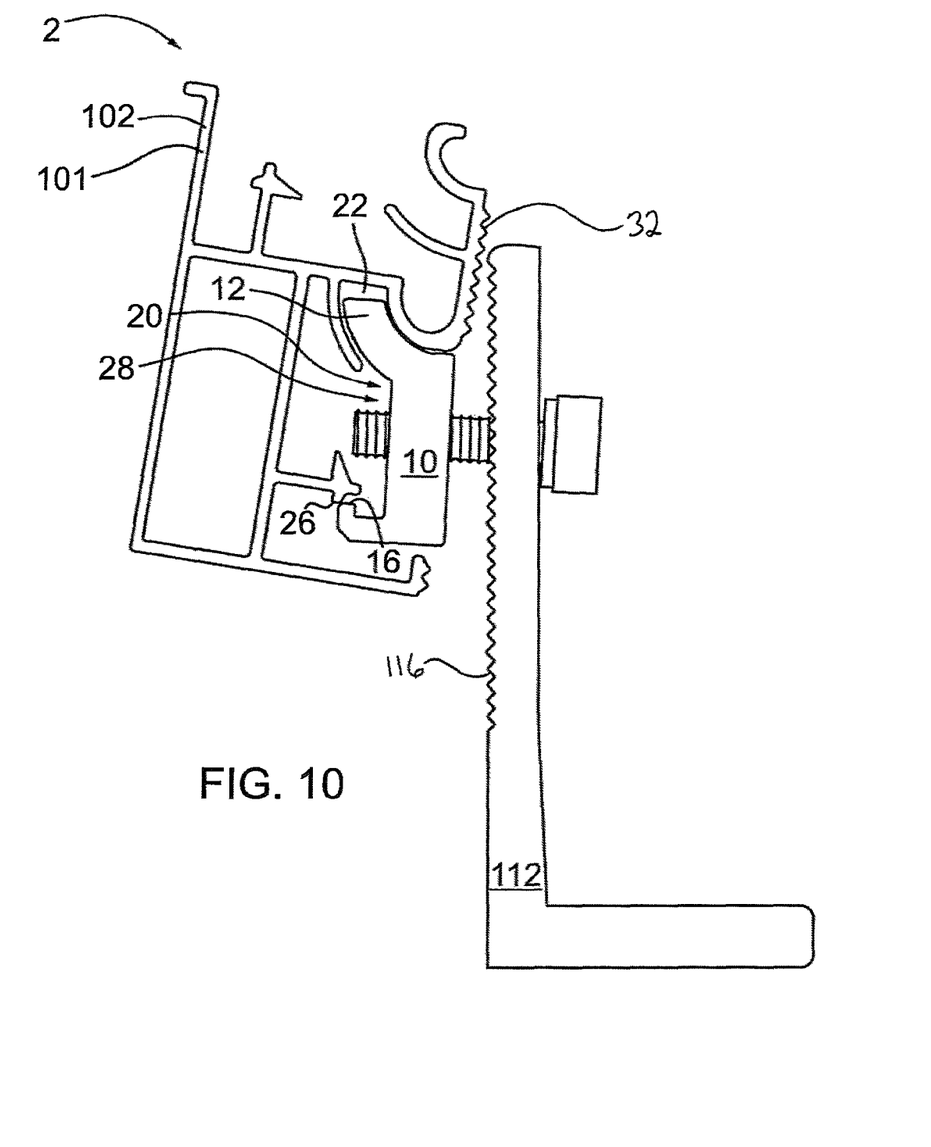
FIG. 10 is a side sectional view of the longitudinal rail subsequent to that shown in FIG. 9 wherein the nut is further received within the receiver of the rail.
Figure 11:
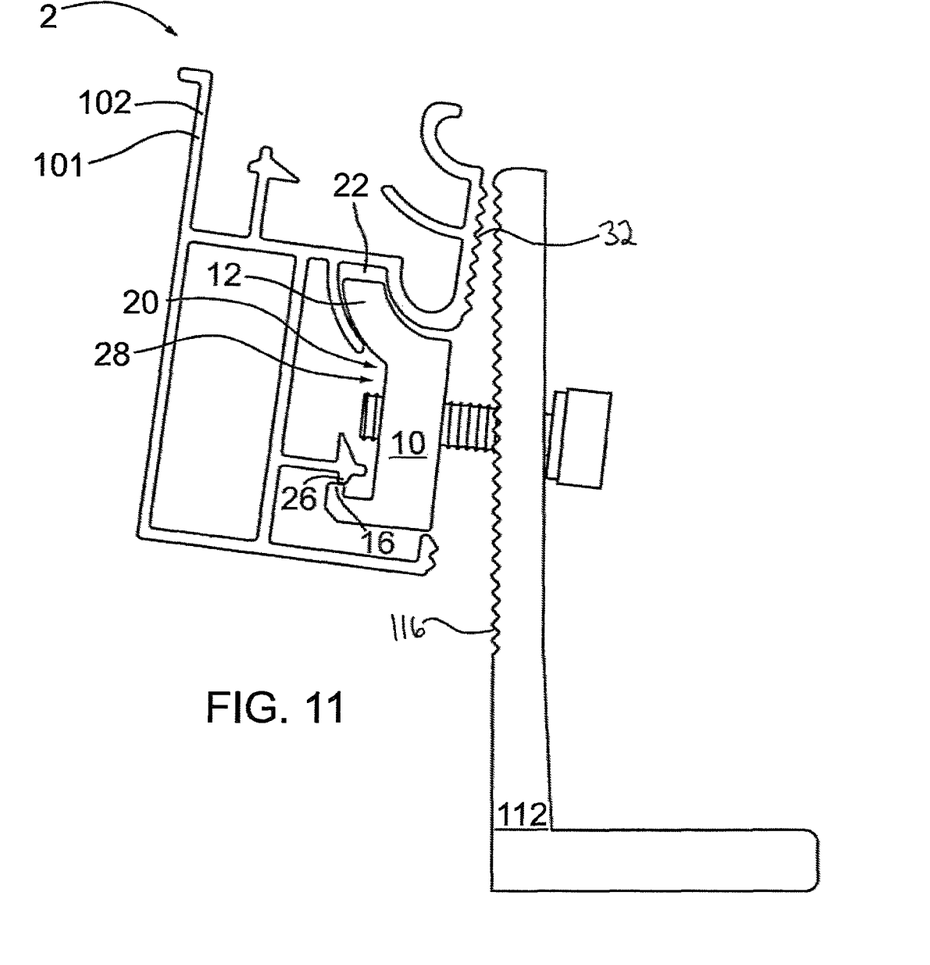
FIG. 11 is a side sectional view subsequent to that shown in FIG. 10 wherein the nut is yet further received within the receiver of the rail.
Figure 12:
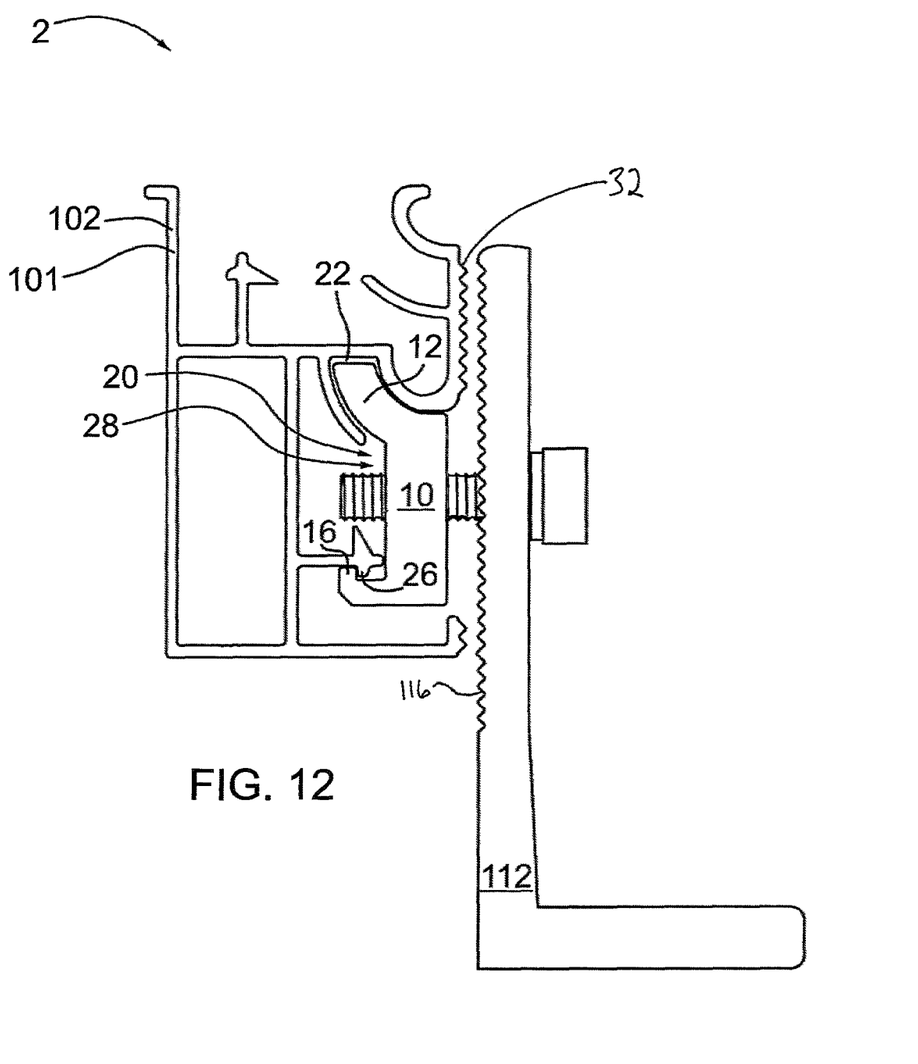
FIG. 12 is a side sectional view of the longitudinal rail subsequent to that shown in FIG. 11 wherein the nut is fully received within the receiver of the rail.

As shown in FIGS. 3 and 6, retainer 24 of rail 101/102 may comprise a rib 26, and flange 14 of nut 10 may include a lip 16. As shown in FIGS. 9 through 12, as the arcuate portion is received within the arcuate channel, rib 26 is releasably engaged with lip 16 to releasably engage the nut within receiver 20. As can be seen in FIGS. 10 to 12, the releasable engagement between rib 26 and lip 16 may comprise the rib snappingly engaging the lip. Contact is first made between lip 16 and rib 26 of the retainer, as shown in FIG. 10. As the arcuate portion of the nut is slid into the arcuate channel of the rail, the retainer forces the nut downward so that lip 16 traverses rib 26, as shown in FIG. 11. Once the lip has cleared the rib, it effectively "snaps" into place inward of the rib, as shown in FIG. 12. At that point the nut will be fully and releasably retained within receiver 20.

Alternatively, retainer 24 may be flexibly resilient. In this case, as the arcuate portion of the nut is slid into the arcuate channel of the rail, lip 16 contacts rib 26 and causes the retainer to flex slightly or to be displaced until the lip clears the rib and effectively "snaps" into place inward of the rib.

Once the lip has cleared the rib, retainer 24 springs back to its rest position, as shown in FIG. 12. The ability of retainer 24 to flex will tend to further facilitate the releasable engagement of nut 10 within receiver 20.

Referring to FIG. 3, rib 26 may include a sloped surface 26a, which is sloped away from the direction of engagement with nut 10 in order to facilitate the traversal of lip 16 over rib 26.

Figure 13:
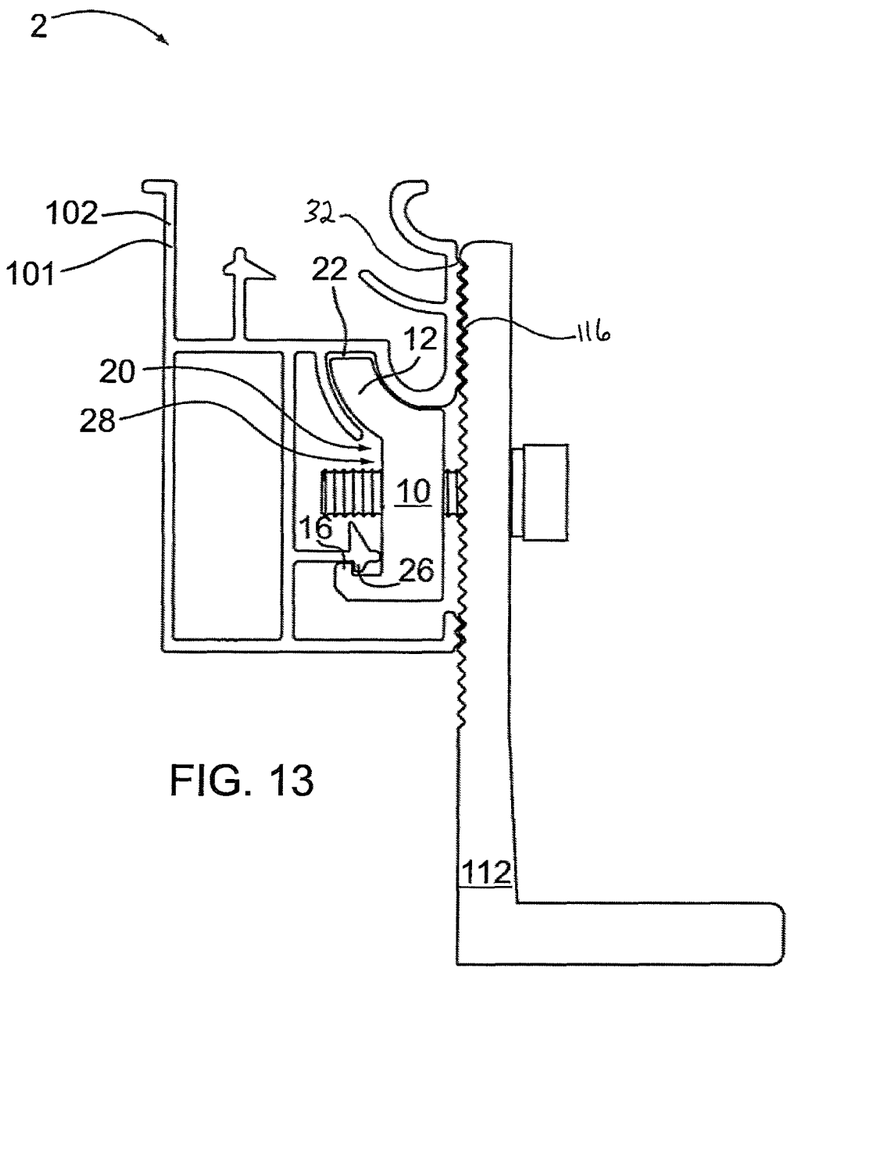
FIG. 13 is a side sectional view of the longitudinal rail subsequent to that shown in FIG. 12 wherein the rail is drawn into contact with a mounting bracket.

Once the nut and the rail are releasably engaged, the bolt can be tightened to draw the nut toward bracket 112 (in the case of bolt 114) or toward rail 104 (in the case of bolt 110). As the respective bolt is tightened, arcuate portion 12 will become frictionally locked within channel 22 and lip 16 will become compressed against rib 26. In this manner the nut will be securely held within receiver 20 (as shown in FIG. 13 in the case of first receiver 28) and the rail will be secured to the structure through which bolt 110/114 passes. Other means for releasable engagement of the flange of the nut and the retainer of the rail are within the scope of the present disclosure. Although the nut has been shown in engagement with mounting brackets 112 and/or clamps 106, it will be understood that nut 10 could also be used in alternative ways.

Referring to FIGS. 3 and 7 through 13, rail 101/102 may include one or more exterior ribs 32, and the mounting bracket may have one or more teeth 116 that are sized and dimensioned for mating engagement with exterior ribs 32. In the case where first nut 11 is releasably engaged to the rail, the rail may be initially hung from nut 11, as shown in FIG. 12. As bolt 114 is tightened, each of the nut and the rail is drawn toward the mounting bracket until the exterior ribs on the rail matingly engage the mounting bracket teeth and the nut becomes securely held within first receiver 28, as described above. The mating engagement between the exterior ribs of the rail and the teeth of the mounting bracket will tend to limit vertical displacement of the rail relative to the mounting bracket.

It will be appreciated that the above-described features will allow users of the attachment system to install solar panel racking systems efficiently and quickly. Where nut 10 is used to releasably secure rail 101/102 to mounting brackets 112, a user can pre-mount the brackets to a surface, and pre-attach the nuts to the mounting brackets using bolts 114 before installing rail 101/102. The rails can be slid over the arcuate portion of the nuts and snapped in place with flange 14 engaging rib 26 of the rail. Once the rails are so installed on the mounting brackets via the nuts, the user can then proceed to tighten each mounting bracket bolt 114 to fixedly secure the rails to the mounting brackets.

A similar process can be followed to secure the lateral rails to the longitudinal rails using clamps 106. Second nut 19 can be slid into arcuate channel 22 of second receiver 30 and snapped in place with flange 14 engaging rib 26. Lateral rail 104 can then be disposed between the head portion 108 of clamp 106 and second nut 19, generally perpendicularly to rail 101/102. Thereafter, the lateral and longitudinal rails can be drawn together to compressingly engage each other by tightening of clamp 106 via bolt 110, as shown in FIG. 2. Alternatively, rail 104 may be clamped between nut 19 and head portion 108 of the clamp, by bolt 110, before the nut is snappingly engaged within the second receiver of rail 101/102.

With an understanding of the disclosure and the claimed invention, one of skill in the art will appreciate that nut 10 will be capable of sliding within receiver 20 to permit the nut to be located at a desired location along the length of the rail, thereby further facilitating the installation of a solar panel racking system.

In an alternate embodiment, nut 10 may be fixed to the structure that would otherwise be engaged by the fastening means. For example, in the case of a mounting bracket, nut 10 may be unitarily formed with, or otherwise fixed to, the bracket such that there is no bolt to tighten once the nut is received within receiver 20. In such cases, stricter dimensional tolerances may be required order to facilitate insertion of the nut within the receiver and to ensure that the rail is held securely in place when the nut is within the receiver. It will be appreciated that such insertion may be facilitated in an embodiment wherein retainer 24 is flexibly resilient.

It will further be appreciated that fastening means or a fastener other than a bolt may be used in the attachment system. For example, the fastening means could be a cam-operated fastener, a screw, a clamp of another configuration or type than that described herein, or other like or similar means. Any such fastener will be capable of securing the respective rail and nut to a structure through which said fastener passes or with which said fastener is otherwise engaged. It will further be understood that the term "structure" as used in the examples described herein refers to a structure to which rail 101/102 can be secured by the attachment system. Here, the structure is either mounting bracket 112 or lateral rail 104, although other structures to which rail 101/102 may be secured could alternately be used. It will also be appreciated that the structure need not be limited to a structure that is a part of a solar panel racking system or solar panel support system.

It is to be understood that what has been described are exemplary embodiments of the invention. The scope of the claims should not be limited by the embodiments set forth above, but should be given the broadest interpretation consistent with the description as a whole.

What is claimed is:

1. An attachment system for a solar panel racking system, the solar panel racking system including a structure, the attachment system comprising:
   a rail defining a longitudinal axis;
   a nut; and
   a fastener;
   said rail including a receiver to releasably receive said nut, said receiver having a retainer and an arcuate channel with two substantially parallel arcuate sides;
   said nut having an arcuate portion, including two substantially parallel arcuate outer edges, sized and dimensioned to be receivable within said arcuate channel, and having a flange for releasable engagement with said retainer;
   wherein said arcuate channel and the arcuate portion are shaped such that said arcuate channel assists in the releasable engagement between said nut and said rail by assisting in cooperatively orienting and positioning said nut to guide said nut into said receiver; and
   wherein said nut is received into said receiver from a direction substantially perpendicular to the longitudinal axis, the arcuate portion is received within said arcuate channel, said flange releasably engages said retainer to releasably engage said nut within said receiver, and said fastener secures said nut within said receiver and thereby secures said rail to the structure.

2. The attachment system of claim 1, wherein said flange comprises a lip, and the lip releasably engages said retainer.

3. The attachment system of claim 1, wherein said fastener is a threaded bolt, said nut further comprises a threaded bore for receipt of said threaded bolt, and said bolt is configured to engage with the structure such that said nut becomes secured within said receiver and said rail becomes secured to the structure upon tightening of said bolt within said bore.

4. The combination of the attachment system of claim 3 with the solar panel racking system structure, wherein said rail further includes one or more exterior ribs and the structure is a mounting bracket attached to a surface to which the solar panel racking system is to be secured, the mounting bracket having one or more teeth sized and dimensioned for mating engagement with said one or more exterior ribs such that as the bolt is tightened, each of said nut and said rail is drawn toward the mounting bracket until said one or more exterior ribs on said rail matingly engage said one or more teeth on the mounting bracket to limit vertical displacement of said rail relative to said mounting bracket.

5. The attachment system of claim 1, wherein said nut is slidably releasably engaged within said receiver to permit said nut to be located at a desired location along said rail.

6. The attachment system of claim 1, wherein said rail has:
   two of said receiver for releasably receiving two of said nut, and
   two of said fastener for securing respective said nuts within respective said receivers and for securing said rail to two structures.

7. The attachment system of claim 6, wherein said two receivers comprise a first receiver and a second receiver, said two nuts comprise a first nut and a second nut, and said two structures comprise a mounting bracket and a lateral rail.

8. The attachment system of claim 7, wherein said first receiver is arranged for releasable attachment of the rail to said mounting bracket via said first nut and one of said two fasteners, and said second receiver is arranged for releasable attachment of the rail to the lateral rail via said second nut and the other of said two fasteners.

9. An attachment system for a solar panel racking system, the solar panel racking system including a structure, the attachment system comprising:
   a rail;
   a nut; and
   a fastener;
   said rail including a retainer, an arcuate channel having two substantially parallel arcuate sides, and an opening along a length of said rail large enough to receive said nut;
   said nut having an arcuate portion, including two substantially parallel arcuate outer edges and a flange; and
   wherein upon said arcuate portion being received within said arcuate channel, said flange releasably engages said retainer to releasably engage said nut to said rail, said fastener securing said nut to said rail and thereby securing said rail to the structure.

10. An attachment system for a solar panel racking system, comprising:
    a rail defining a longitudinal axis;
    a first nut; and
    a first fastener;
    the rail including a first receiver;
    the first receiver comprising a first retainer, a first arcuate channel having two substantially parallel arcuate sides, and a first opening parallel to the longitudinal axis sized to receive the first nut;
    the first nut having a flange and an arcuate portion, including two substantially parallel arcuate outer edges shaped in a complementary manner to the first arcuate channel and receivable within the first arcuate channel.

11. The attachment system of claim 10, wherein the flange comprises a lip and the lip releasably engages the first retainer.

12. The attachment system of claim 10, wherein the rail further includes one or more exterior ribs configured for mating engagement with teeth or ribs on a structure or mounting bracket.

13. The attachment system of claim 10, wherein the first nut is slidably releasably engaged within the first receiver to permit the first nut to be located at a desired location along the rail.

14. The attachment system of claim 10, wherein the rail further comprises:
   a second receiver for releasably receiving a second nut; and
   a second fastener for securing the second nut within the second receiver;
   wherein the second receiver comprises a second retainer, a second arcuate channel having two substantially parallel arcuate sides, and a second opening parallel to the longitudinal axis sized to receive the first nut.

15. The attachment system of claim 14, wherein the first and second receivers are rotated with respect to each other.

16. The attachment system of claim 15, wherein the first and second receivers are oriented substantially perpendicularly to each other.

17. The attachment system of claim 14, wherein
   the first receiver further comprises a first chamber and a second chamber, wherein the first and second chambers are separated by the first retainer; and
   the second receiver further comprises a third chamber and a fourth chamber wherein the third and fourth chambers are separated by the second retainer.

18. The attachment system of claim 17, wherein
   the first arcuate channel is located within the first chamber and the second chamber is shaped to receive the flange of the first nut; and
   the second arcuate channel is located within the third chamber and the fourth chamber is shaped to receive the flange of the second nut.

* * * * *